(12) United States Patent
Meer

(10) Patent No.: US 7,272,386 B2
(45) Date of Patent: Sep. 18, 2007

(54) SYSTEM AND METHOD FOR PROVIDING LOCATION AND CALL BACK INFORMATION FOR SPECIAL NUMBER CALLS FROM PHONE SETS SERVICED BY A PRIVATELY SERVED NETWORK

(75) Inventor: Stephen Marc Meer, Niwot, CO (US)

(73) Assignee: Intrado Inc., Longmont, CO (US)

( * ) Notice: Subject to any disclaimer, the term of this patent is extended or adjusted under 35 U.S.C. 154(b) by 423 days.

(21) Appl. No.: 10/354,803

(22) Filed: Jan. 30, 2003

(65) Prior Publication Data
US 2003/0148757 A1 Aug. 7, 2003

Related U.S. Application Data

(60) Provisional application No. 60/353,460, filed on Jan. 31, 2002.

(51) Int. Cl.
H04M 3/42 (2006.01)
H04Q 7/22 (2006.01)
H04Q 7/38 (2006.01)

(52) U.S. Cl. ............... 455/414.1; 379/198; 379/225; 379/231; 379/232; 379/234; 455/554.1; 455/555

(58) Field of Classification Search ............... None
See application file for complete search history.

(56) References Cited

U.S. PATENT DOCUMENTS

| | | | |
|---|---|---|---|
| 5,161,180 A * | 11/1992 | Chavous | 379/45 |
| 5,339,351 A * | 8/1994 | Hoskinson et al. | 379/45 |
| 6,757,359 B2 * | 6/2004 | Stumer et al. | 379/45 |
| 2002/0132638 A1 * | 9/2002 | Plahte et al. | 455/555 |
| 2003/0048879 A1 * | 3/2003 | Wrona et al. | 379/32.05 |
| 2003/0086538 A1 * | 5/2003 | Geck et al. | 379/45 |

* cited by examiner

Primary Examiner—Duc M. Nguyen
Assistant Examiner—Matthew Genack

(57) ABSTRACT

A system for handling special number calls placed from a phone coupled at a connection locus in a private network; includes: (a) a private switch controlling communications with the phone from outside the private network during a call session; (b) a control facility coupled with the private switch and with a special number call system for effecting communications between the private network and the special number call system; and (c) a contact parameter storage unit coupled with at least one of the private switch and the special number call system for identifying at least one contact parameter relating to the connection locus at least during the call session. The private switch, the control facility and the special number call system cooperate in using the contact parameter to effect call back from the special number call system to the phone at least during the call session.

19 Claims, 6 Drawing Sheets

SYSTEM AND METHOD FOR PROVIDING LOCATION AND CALL BACK INFORMATION FOR SPECIAL NUMBER CALLS FROM PHONE SETS SERVICED BY A PRIVATELY SERVED NETWORK

This application claims benefit of prior filed now abandoned Provisional Patent Application Ser. No. 60/353,460, filed Jan. 31, 2002.

BACKGROUND OF THE INVENTION

The present invention is directed to telecommunications and especially to handling special number calls from phone sets serviced by a private service provider, such as a private branch exchange (PBX). Special Number services, such as the E9-1-1 voice network in the United States, are based upon an assumption that the origination locus of a special number call is known prior to the initiation of the call. This presumption has traditionally been correct because the specific address and location at an address is associated with every telephone number that supports fully capable special number calling.

For purposes of illustration, by way of example and not by way of limitation, the present invention will be discussed in the context of an emergency service network in the United States, commonly referred to as an E9-1-1 network. The teachings of the present invention are equally applicable, useful and novel in other special number calling systems, such as maintenance service networks, college campus security networks and other networks.

Known location information is used to route E9-1-1 calls to an appropriate Public Safety Answering Point (PSAP). The same information is used by the PSAP to support the emergency response to the call, such as dispatching fire, police or emergency medical personnel and equipment and for call back to the call originator if necessary. Some telephone systems support changing location of telephone instruments within an area, such as within a building, or within a campus or within a local or wide area network. Such telephone systems give rise to significant operational challenges for a special number calling system, such as an E9-1-1 system. When a phone instrument is moved its phone number moves with it, so full support for E9-1-1 calls cannot be provided until up to date location information for the phone instrument is available to a serving E9-1-1 infrastructure to deliver when necessary to the PSAP or other service provider. In prior art communication systems, such updating of location-to-instrument information was effected by a phone user notifying a facilities manager or similar person of the move. The facilities manager entered a database of location-to-number information to update the database to accurately indicate the correct new location-to-instrument information for the recently moved telephone instrument. Often there was a significant time lag between the time the instrument moved and the time the E9-1-1 system was appropriately updated to reflect the change. The greater the degree of telephone instrument mobility that is provided by a system, the greater the strain that is placed on the special number calling networks that serve that system in keeping up with the changes. Voice over IP (Internet Protocol) systems pose significant difficulties for special number network support because of the great degree of mobility that is available for instruments in such a system. Recent developments of data communication systems also permit great mobility for phone instruments. For example, some digital phone instruments used with such data communication networks are capable of connecting with the data communication network and signaling to the network controller their identifying number and authorization for accessing the system. Such mobility may span a building, a campus or even several cities or states. Such communication system capabilities are examples of portability-supporting systems that are particularly difficult to fully support with special number network services, such as E9-1-1 support services.

In the case of a private communications service operator or provider, such as a private branch exchange (PBX), in most situations a unique telephone number associated with an individual instrument "behind" or served by the PBX is not transmitted to the telephone company Central Office serving the PBX and therefore the Central Office cannot differentiate among different instruments subtended to the PBX nor their location when calls are originated from these instruments. The Central Office only is aware of predetermined Pilot numbers that have been associated with the system wide shared circuits interconnecting the PBX and Central Office. This lack of unique telephone instrument awareness can be present even in situations where the Central Office provides the PBX with Direct Inward Dial (DID) service. Determining a particular location within the geographical area serviced by the PBX switch is only possible if the PBX switch somehow notifies the serving E9-1-1 system for relay to the PSAP regarding such location information. Present privately serviced networks do not efficiently or timely inform an E9-1-1 system or PSAP with location information with sufficiently fine granularity to pinpoint the location of a particular phone instrument.

With the coarse granularity presently available to an E9-1-1 PSAP, police or emergency service personnel may go to a location indicated for a particular phone number and find that they have arrived at a large office building or at a widespread college campus with no means available for locating the caller with greater accuracy. In situations involving a corporate PBX the emergency services personnel may respond to a building in an incorrect city or state. Valuable time may be spent in finding the particular locus of the caller to render the required assistance. Such delays can be life threatening in the case of emergency service calls.

There is a need for a system and method for providing appropriate call routing, location and call back information for special number calls, such as E9-1-1 calls from a privately served network, such as a PBX.

There is a need for providing such location and call back information while accommodating mobility of telephone instruments within the privately served network.

SUMMARY OF THE INVENTION

A system for handling special number calls placed from a phone coupled at a connection locus in a private network; includes: (a) a private switch controlling communications with the phone from outside the private network during a call session; (b) a control facility coupled with the private switch and with a special number call system for effecting communications between the private network and the special number call system; and (c) a contact parameter storage unit coupled with at least one of the private switch and the special number call system for identifying at least one contact parameter relating to the connection locus at least during the call session. The private switch, the control facility and the special number call system cooperate in using the contact parameter to effect call back from the special number call system to the phone at least during the call session.

A method for handling special number calls placed from a phone instrument served by a privately served network; the phone instrument being coupled within the privately served network at a connection locus; includes the steps of: (a) in no particular order: (1) providing a private telecommunication switch apparatus for controlling communications with the phone instrument from outside the privately served network during a call session; (2) providing a telecommunication control facility coupled with the private telecommunication switch apparatus and with a special number call system for effecting communications between the privately served network and the special number call system; and (3) providing a contact parameter storage means coupled with at least one of the private telecommunication switch apparatus and the special number call system for identifying at least one contact parameter relating to the connection locus at least during the call session; and (b) operating the private telecommunication switch apparatus, the telecommunication control facility and the special number call system to cooperate in using the contact parameter to effect call back from the special number call system to the phone instrument at least during the call session.

A privately served network shall be hereinafter sometimes referred to as a PBX network. The term PBX network is intended in the context of this description to include any network or other communication system that manages an internal communication network and is served by a phone company using trunk lines having dialable numbers. The individual numbers for phone instruments within the internal communication network are not reachable from the phone company facilities except through a private switch, referred to as a PBX switch.

A first system and method for providing location and call back information for special number calls from a PBX network assigns dialable pseudo-numbers with predetermined locations and employs the pseudo-numbers for effecting E9-1-1 calls from instruments when dialing 9-1-1 or other special numbers that may employ the present invention. The preassigned relationships between the locations and the pseudo-numbers provide the desired location information and provide a call back capability for a PSAP if needed.

A second system and method for providing location and call back information for special number calls from a PBX network leaves phone numbers unchanged and requires maintaining a registry for respective locations and call back numbers for individual phone numbers. The second system and method contemplates establishing a communication line between the PBX system and a data repository accessible by a PSAP for providing phone number location as a call is completed. Preferably, the data repository is a computer accessible database available to the PSAP and the E9-1-1 system. Most preferably, the data repository is the respective one or more ALI (Automatic Location Information) databases that are accessible by PSAP facilities in presently extant E9-1-1 systems. Further, it is preferable that the communication line be in the nature of a data communication line, most preferably a high speed data communication line.

It is therefore an object of the present invention to provide a system and method for providing location and call back information for special number calls, such as E9-1-1 calls, from a privately served network, such as a PBX.

It is a further object of the present invention to provide a system and method for providing appropriate call routing, location and call back information for special number calls, such as E9-1-1 calls, from a privately served network, such as a PBX, while accommodating mobility of telephone instruments within the privately served network.

Further objects and features of the present invention will be apparent from the following specification and claims when considered in connection with the accompanying drawings, in which like elements are labeled using like reference numerals in the various figures, illustrating the preferred embodiments of the invention.

DETAILED DESCRIPTION OF THE PREFERRED EMBODIMENT

PBX exchanges have generally been utilized to enhance ease of calling within a service group, provide specialized calling features and as a cost saving measure. If one has a business or college campus or other locale requiring phone access by numerous individual phone users each having their own respective phone instrument, it can be cost prohibitive to arrange for a telephone company service provider to connect an individual phone line for each user. It is sometimes more efficient and cost effective to arrange for a high capacity line or lines to deliver phone service from a Central Office to a PBX switch and let the PBX switch effect connection with each individual user's phone instrument, thereby sharing a smaller number of circuits between the PBX and the Central Office than would be needed if each instrument was served with its own individual circuit. As a consequence of such an arrangement, each individual phone instrument privately served by the PBX switch may be assigned a pseudo-number, or a phantom number that is not recognizable by the phone company. Accordingly, if one dials 9-1-1 to seek emergency assistance from a PBX served phone instrument, the only information that can be discerned by the Public Safety Answering Point (PSAP), as the origin of the call is the location of the circuits that terminate on the PBX switch and a "pilot" telephone number assigned to the group of circuits rather than specific information about the location or call-back number of the particular instrument that placed the 9-1-1 call.

Figure 1:
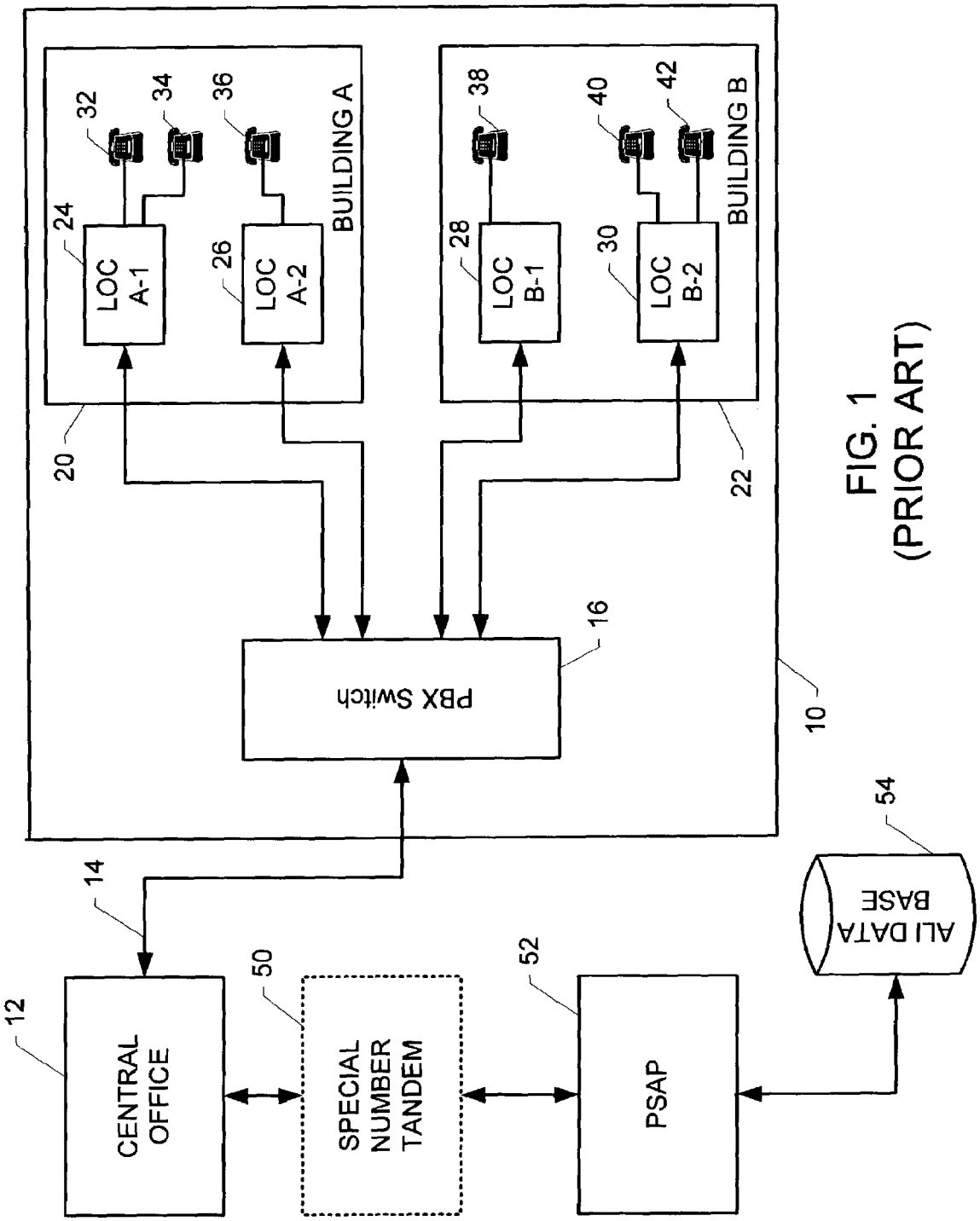
FIG. 1 is a schematic diagram of a prior art system for providing E9-1-1 service for a privately served communication network.

FIG. 1 is a schematic diagram of a prior art system for providing E9-1-1 service for a privately served communication network. In FIG. 1, a privately served network 10 is communicatingly coupled with a telephone service provider Central Office 12 by a communication trunk 14. Access to privately served or PBX (Private Branch Exchange) network 10 is made from Central Office 12 by dialing a phone number to connect a PBX switch 16 with Central Office 12 via communication path (e.g., a line, trunk or packet) 14.

PBX network 10 includes a plurality of buildings 20, 22. Each building 20, 22 contains a plurality of access loci 24, 26, 28, 30. Each locus 24, 26, 28, 30 includes connection for at least one phone instrument. Thus, access locus 24 provides connection for phone 32, 34. Access locus 26 provides connection for a phone 36. Access locus 28 provides connection for a phone 38. Access locus 30 provides connection for phones 40, 42. Phone instruments 32, 34, 36, 38, 40, 42 are portable within PBX 16 in so far as they may be unplugged from a connection, such as a telephone jack, and moved to a second access locus for plugging into another connection for operation from the second access locus. Many systems like PBX network 16 have administrative procedures for requesting a location change for a phone instrument, approval for a change of access locus and updating the directory that correlates access locus and connection with each respective phone instrument. It is difficult to keep up with changes of phone instrument locations that typically occur in even moderately sized enterprises. Other systems like PBX network 16 operate in a manner to allow users to change location of a telephone instrument at will with no manual administrative process. This type of system recognizes the uniqueness of an individual instrument within the PBX network 10 such that the telephone "owner" and the owner's associated telephone number are associated with the instrument and not the instrument connections ports of the PBX 16. This allows the telephone instrument to be moved anywhere within the confines of the PBX system 10, connect to any available connection point associates with PBX system 16 and still retain the owner/user telephone number and full telephony function.

Central Office 12 is coupled for E9-1-1 operations with a tandem 50. Tandem 50 is a specialized switch configured for handling E9-1-1 traffic. Connection with tandem 50 may be established via the PSTN (Public Switched Telephone Network), via a direct line, via a wireless connection or by another connection means including but not limited to data packets including encoded voice information. Tandem 50 is coupled with a Public Safety Answering Point (PSAP) 52. Connection may also be established between Central Office 12 and PSAP 52 directly without involving tandem 50. It is for this reason that tandem 50 is indicated in FIG. 1 using dotted line notation. PSAP 52 is the facility that fields inquiries and requests pertaining to emergency services, and either effects dispatching or cooperates with dispatchers for sending police, fire or emergency medical equipment and personnel to the scene of an emergency. Connection with PSAP 52 may be established via the PSTN, via a direct line or trunk, via a wireless connection or by another connection means. PSAP 52 is able to access an ALI (Automatic Location Information) database 54. ALI database 54 is a specialized database correlating information particularly advantageous for E9-1-1 operations, including location information relating to phone numbers. ALI database 54 may be colocated with PSAP 52, but is commonly off-site with respect to PSAP 52 yet easily accessible by PSAP 52. By consulting ALI database 54, (manually or automatically) personnel operating PSAP 52 can ascertain a location for the particular phone number from which an emergency call is originated. However, when a call originates from PBX network 10, only the phone number relating to trunk 14 is displayed. There are some situations where a DID number associated with an individual instrument is also delivered via 14. This requires that all DID locations be coordinated with the E9-1-1 data environment and precludes "at will" mobility that supports E9-1-1 since the only way the location can be updated for 9-1-1 purposes is via the administrative update. Such a system does not support mobility of phone instruments within the PBX system. Therein lies the impetus for the present invention: providing caller location information relating to originators of special number calls from within a PBX system while supporting mobility of phone instruments within the PBX system.

Figure 2:
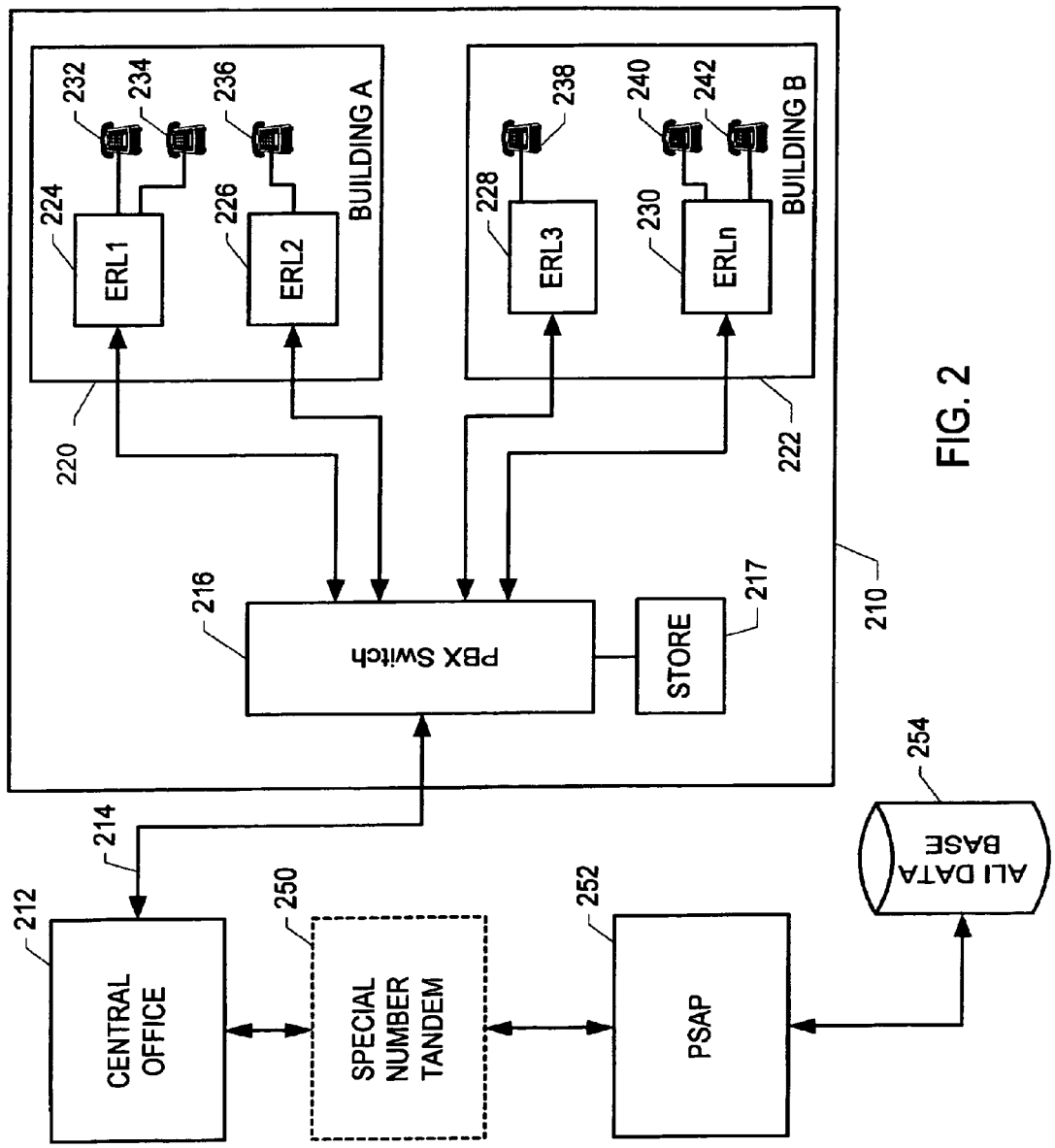
FIG. 2 is a schematic diagram of a first embodiment of a system for providing E9-1-1 service for a privately served communication network according to the present invention.

FIG. 2 is a schematic diagram of a first embodiment of a system for providing E9-1-1 service for a privately served communication network according to the present invention. In FIG. 2, a privately served network 210 is communicatingly coupled with a telephone service provider Central Office 212 by a communication trunk 214. Access to privately served or PBX (Private Branch Exchange) network 210 is made from Central Office 212 by dialing a phone number to connect a PBX switch 216 with Central Office 212 via communication path 214 (e.g., a line, trunk or voice carrying data packet).

PBX network 210 includes a plurality of buildings 220, 222. Each building 220, 222 contains a plurality of access loci 224, 226, 228, 230. For purposes of emergency service request calls (i.e., E9-1-1 calls) each respective access locus 224, 226, 228, 230 is designated as a respective Caller Location (CLOC). Thus access locus 224 is designated as CLOC 1, access locus 226 is designated as CLOC 2, access locus 228 is designated as CLOC 3, and access locus 230 is designated as CLOCn. The "n" notation is employed in this description to indicate that there is no particular limit to the number of CLOCs that can be designated in PBX network 210. Each locus 224, 226, 228, 230 includes connection for at least one phone instrument. Thus, access locus 224 provides connection for phone 232, 234. Access locus 226 provides connection for a phone 236. Access locus 228 provides connection for a phone 238. Access locus 230 provides connection for phones 240, 242. Phone instruments 232, 234, 236, 238, 240, 242 are portable within PBX network 210 in so far as they may be unplugged from a connection, such as a telephone jack, and moved to another access locus for plugging into another connection and operation from the other access locus. Central Office 212 is coupled for E9-1-1 operations with a special number call system 251 via a tandem 250. Tandem 250 is a specialized switch configured for handling E9-1-1 traffic. Connection with tandem 250 may be established via the PSTN, via a direct line, via a wireless connection or by another connection means including voice carrying data packets. Tandem 250 is coupled with a Public Safety Answering Point (PSAP, also sometimes referred to as a Public Safety Answering Position) 252. Connection may also be established between Central Office 212 and PSAP 252 directly without involving tandem 250. It is for this reason that tandem 250 is indicated in FIG. 2 using dotted line notation. PSAP 252 is a facility that fields inquiries and requests pertaining to emergency services, and either effects dispatching or cooperates with dispatchers for sending police, fire or emergency medical equipment and personnel to the scene of an emergency. Connection with PSAP 252 may be established via the PSTN, via a direct line or trunk, via a wireless connection or by another connection means including voice carrying data packets. PSAP 252 is able to access an ALI (Automatic Location Information) database 254 or other database that may be incorporated for use in the system to aid in call completion or data display. ALI database 254 is a specialized database correlating information particularly advantageous for E9-1-1 operations, including location information relating to phone numbers or how the telephone network should operate when servicing calls employing the present invention. ALI database 254 may be colocated with PSAP 252, but is commonly off-site with respect to PSAP 252 yet easily accessible by PSAP 252 manually or automatically. By consulting ALI database 254, personnel operating PSAP 252 or systems serving PSAP 252 can ascertain a location for the particular phone number from which an emergency call is originated.

One system and method for providing location and call back information for special number calls from a PBX network 210 establishes predetermined zones (Caller Locations CLOC1, CLOC2, CLOC3, CLOCn) within PBX network 210. A given CLOCn may include a single telephone jack or may encompass a floor of a building or an entire building. Preferably a given CLOCn defines an area within a single building that allows emergency personnel to easily locate a particular originating phone instrument upon arriving at the locus indicated for the originating CLOCn.

At least on directly dialable pseudo-number, or phantom number is assigned to each respective predetermined CLOCn. When an E9-1-1 call is placed from an originating CLOCn, the dialing of E9-1-1 is detected and one of the at least one assigned pseudo-numbers assigned to the respective originating CLOCn is employed for placing the E9-1-1 call. PBX switch 216 recognizeds the use of a pseudo-number as being occasioned by an E9-1-1 call and notes the location (i.e., the originating CLOCn) and its associated originating instrument from which that particular pseudo-number originates for an individual call. The required originating CLOCn identification may be effected, for example, using a database at PBX switch 216 or coupled with PBX switch 216 such as a store 217 containing contact parameters such as the predetermined location pseudo-number assignments.

PBX switch 216 employs the pseudo-number for completing the call over service trunk 214 (or other connection type) to Central Office 212, and Central Office 212 employs the pseudo-number to complete the call to PSAP 252 including which PSAP to which to complete the call according to predetermined rules for calls placed from the various CLOCs. The call routing with PSAP 252 may involve, for example, 9-1-1 tandem 250 or the PSTN (Public Switched Telephone Network) 252 or other connections or combinations of connections. PSAP 252 uses the pseudo-number for call back directly to the respective originating CLOCn if required as well as a key to the ALI database to retrieve appropriate response information related to the respective originating CLOCn. In such a case, PBX switch 216 has stored the respective CLOCn for the particular now-in-use pseudo-number in a store 217 and recognizes the pseudo-number as having been recently employed for placing an E9-1-1 call. Thus, PBX switch 216 must store the respective CLOCn, for example in store 217, when placing a call to central office 212 using a pseudo-number in order that call back from PSAP 252 may be effected directly to originating CLOCn via PBX Switch 216. Central Office 212, PSAP 252 and other agencies or facilities may be advised in advance of the pseudo-numbers and their respective CLOCn location assignments and store those relationships for their own reference. PSAP 252 may, for example, use an ALI (Automatic Location Information) database 254 for storing location—pseudo-number information. Alternatively, the location information may be provided contemporaneously with the call placement. Another alternate arrangement may provide that the location information be provided in response to queries for the information.

In summary, the first embodiment of the present invention provides for E9-1-1 calls to effect "overriding" the normal phone number by which the PBX switch is accessed and imposing a temporary number (a pseudo-number, or a phantom number) that is related to the location from which the E9-1-1 call is originated. The PBX switch preferably maintains that temporary number active and dialable for the duration of the emergency and some additional time that may be predetermined, or set on a situational basis by any of the system elements, thereby facilitating call back by the PSAP to the call originator. Following the expiration of the pseudo-number use for an individual call, the pseudo-number is returned to eligible status to be used for a subsequent call.

Figure 3:
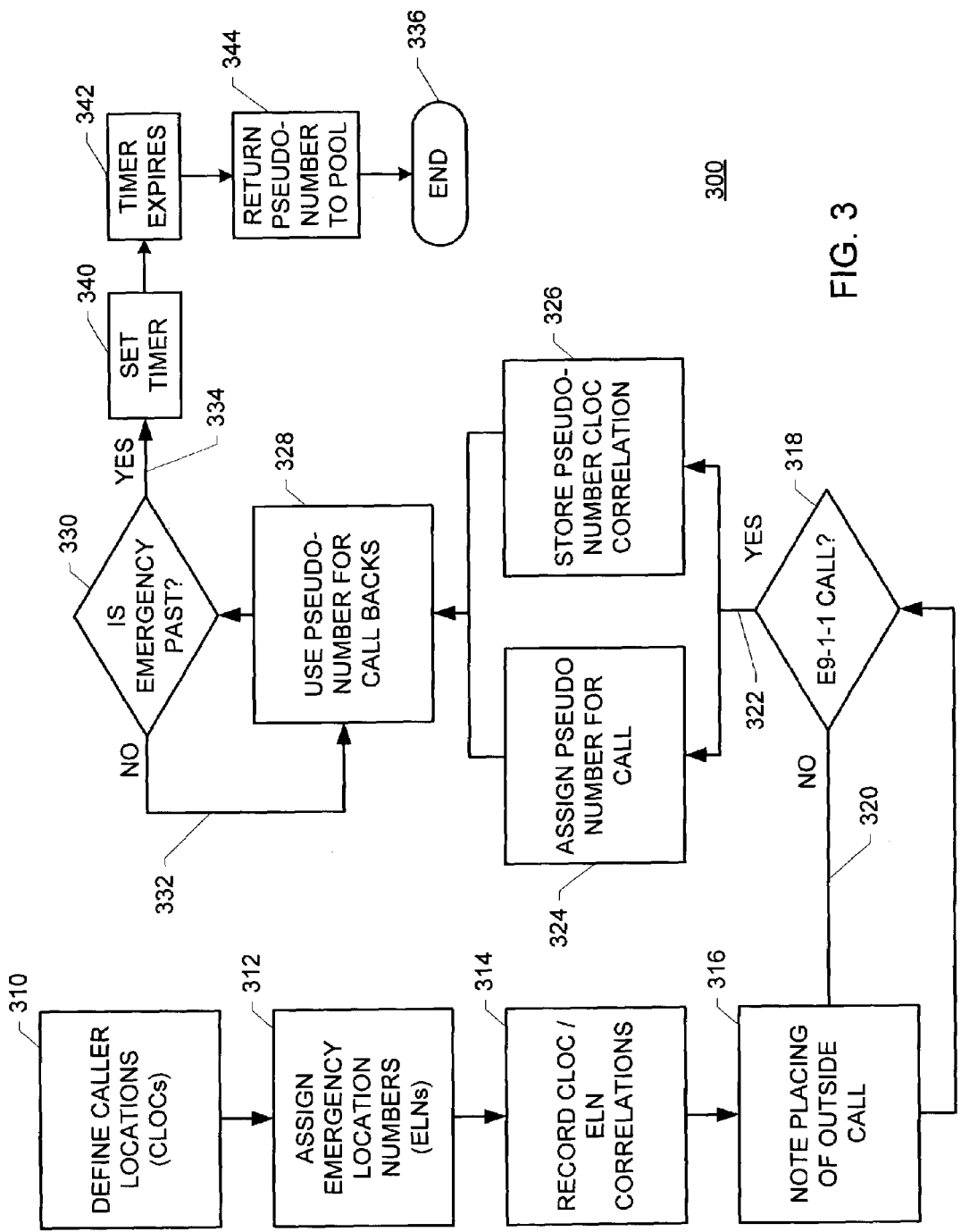
FIG. 3 is a flow diagram illustrating a first embodiment of the method of the present invention.

FIG. 3 is a flow diagram illustrating a first embodiment of the method of the present invention. In FIG. 3, a method 300 begins with defining Caller Locations (CLOCs) within a PBX network (e.g., PBX network 210; FIG. 2), as indicated by a block 310. Preferably each respective CLOC defines an area within a single building. Most preferably, a CLOC has a geographic area that permits emergency personnel to readily locate an emergency in progress after arrival at the locus designated for the CLOC. There may be a requirement that a single building or even a single floor in a building should have more than one CLOC. Preferably no area should be included in more than one CLOC.

Method 300 continues by assigning Emergency Location Numbers (ELNs) as indicated by a block 312. One or more ELN may be assigned for each respective CLOC. Each ELN is a "live" dialable phone number that can be used to complete outgoing calls and can be dialed by a party outside the PBX network to effect delivery of incoming calls to its respective CLOC. The correlations between CLOCs and respective ELNs are recorded in an information database, as indicated by a block 314. Recording according to block 314 may be effected at the PBX switch serving the PBX network, or in an E9-1-1 database (such as an ALI database), in other locations or in some combination of locations.

Method 300 continues with the PBX switch noting the occurrence of placing an outgoing call from a station within the PBX network, as indicated by a block 316. Method 300 continues by posing a query, as indicated by a query block 318, whether the call placed is an E9-1-1 call (or other call to be subjected to this call treatment, such as another special number call). If the call is not an E9-1-1 call or other call of interest to be subjected to this process, method 300 proceeds according to "NO" response line 320 to return to block 316 and await placement of another outgoing call. If the call is an E9-1-1 call, method 300 proceeds according to "YES" response line 322. Method 300 continues from "YES" response line 322 by, in no particular order, assigning a pseudo-number for the E9-1-1 call, as indicated by a block 324, and storing the pseudo-number thus assigned along with its associated CLOC, as indicated by a block 326.

Method 300 continues by using the stored pseudo-number for routing any call backs from outside the PBX network using the stored pseudo-number to the CLOC from which the E9-1-1 call originated, as indicated by a block 328. Method 300 continues by posing a query whether the emergency situation is past, as indicated by a query block 330. If the emergency situation is not past, that is it is still ongoing, method 300 proceeds according to "NO" response line 332, returns to block 328 and continues to use the stored pseudo-number for routing call backs to the CLOC from which the E9-1-1 call originated. If the emergency situation is past, method 300 proceeds according to "YES" response line 334 to end, as indicated by an end locus 336. In order to ensure that pseudo-numbers are not inadvertently assigned for two simultaneous callers, method 300 may include a step of setting a timer, as indicated by a block 340. Method 300 then provides for waiting until the timer expires, as indicated by a block 342 before returning the pseudo-number to a pool of pseudo-numbers for later use, as indicated by a block 344. Thereafter, the stored pseudo-number correlation with the CLOC from which the E9-1-1 call originated (block 326) may be erased.

If the PSAP needs to call the person who originated the E9-1-1 call, the ELN used to place the E9-1-1 call is used for call back and the PBX switch serving the PBX network from which the E9-1-1 call originated uses the stored pseudo-number correlation with the originating CLOC (block 326) to route the call to the originating CLOC (block 328). The call may be completed, for example, using the PSTN (Public Switched Telephone Network) or another call placing connection in the manner by which other routine calls are placed to the PBX network. The PBX switch serving the PBX network effects routing of the call to the CLOC from which the E9-1-1 call originated. If the correlation between pseudo-numbers and CLOCs is available to the PSAP or to emergency personnel, as is preferred, then that information is useful in guiding the emergency personnel to the precise locus within the PBX network from which the E9-1-1 call originated.

If another E9-1-1 call is originated from the same CLOC as the first E9-1-1 call originated, the PBX switch may follow the same method 300, but assign another ELN to the call. Thus, it is preferred that more than one ELN be assigned for each CLOC. The method the PBX switch employs for selecting subsequent ELNs may be to provide a predetermined list of ELNs for each respective CLOC for selection by the PBX switch and provide for having the PBX switch simply select the next ELN on the predetermined list for the next subsequent E9-1-1 call from the same CLOC. Once all ELNs assigned to a particular CLOC have been exhausted, the PBX switch may return to the first number on the predetermined list and continue on using method 300 as described above using a "recycled" ELN. Other selection and assignment methods may be employed. For example, ELNs can also be "recycled" by setting a timer when a particular ELN is used. After a predetermined time elapses, the ELN may be automatically returned to a pool of ELNs available for use with the respective CLOC.

Figure 4:
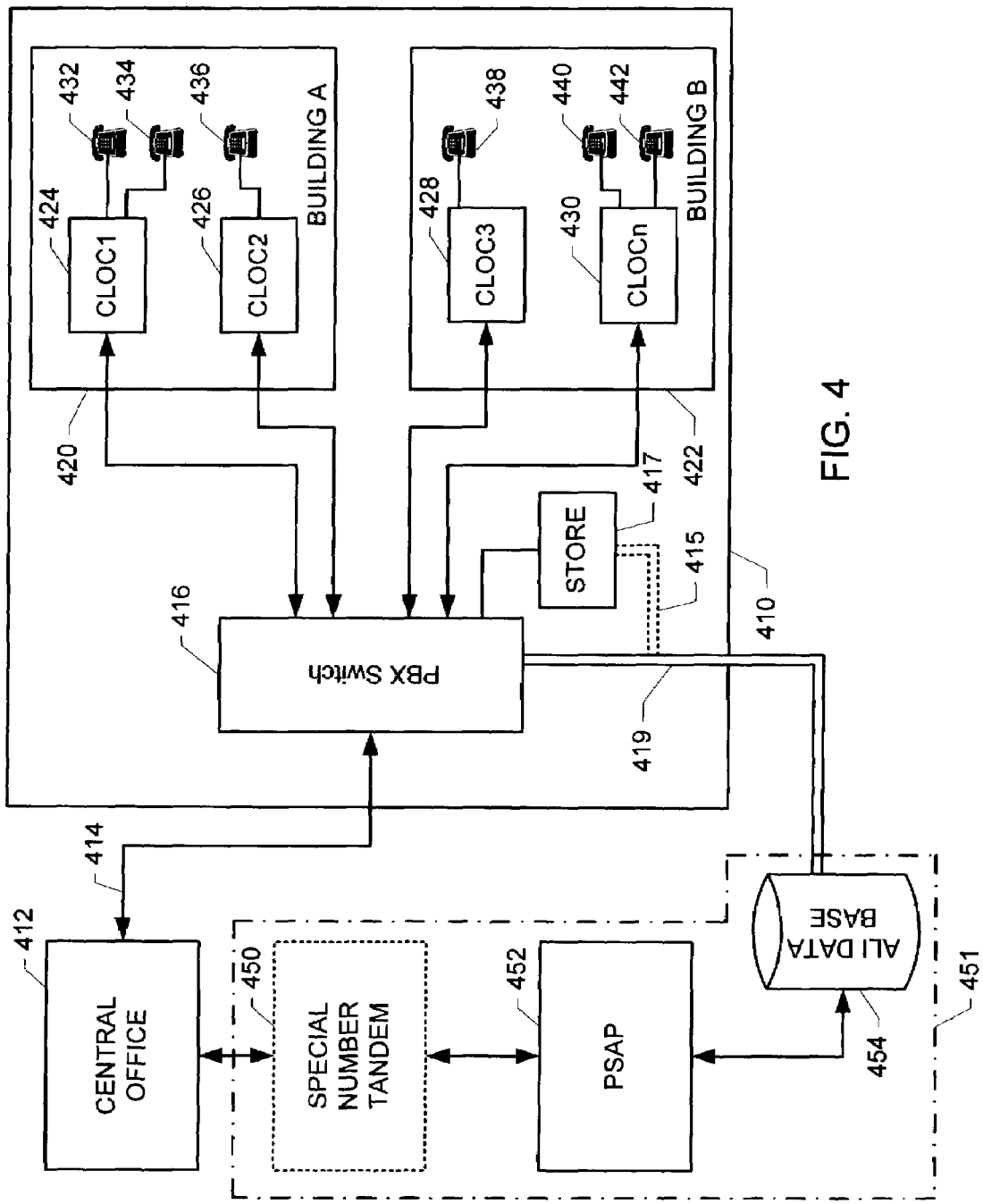
FIG. 4 is a schematic diagram of a second embodiment of a system for providing E9-1-1 service for a privately served communication network according to the present invention.

FIG. 4 is a schematic diagram of a second embodiment of a system for providing E9-1-1 service for a privately served communication network according to the present invention. In FIG. 4, a privately served network 410 is communicatingly coupled with a telephone service provider Central Office 412 by a communication path 414 (e.g., a line, trunk or voice carrying data packet). Access to privately served or PBX (Private Branch Exchange) network 410 is made from Central Office 412 by dialing a phone number to connect a PBX switch 416 with Central Office 412 via communication trunk 414.

PBX network 410 includes a plurality of buildings 420, 422. Each building 420, 422 contains a plurality of access loci 424, 426, 428, 430. For purposes of emergency service request calls (i.e., E9-1-1 calls) each respective access locus 424, 426, 428, 430 is designated as a respective Caller Location (CLOC). Thus access locus 424 is designated as CLOC1, access locus 426 is designated as CLOC2, access locus 428 is designated as CLOC 3, and access locus 430 is designated as CLOCn. The "n" notation is employed in this description to indicate that there is no particular limit to the number of CLOCs that can be designated in PBX network 410. Each locus 424, 426, 428, 430 includes connection for at least one phone instrument. Thus, access locus 424 provides connection for phone 432, 434. Access locus 426 provides connection for a phone 436. Access locus 428 provides connection for a phone 438. Access locus 430 provides connection for phones 440, 442. Phone instruments 432, 434, 436, 438, 440, 442 are portable within PBX network 410 in so far as they may be unplugged from a connection, such as a telephone jack, and moved to a second access locus for plugging into another connection and operation from the second access locus. Central Office 412 may be coupled for E9-1-1 operations with a special number call system 451 via a tandem 450. Tandem 450 is a specialized switch configured for handling E9-1-1 traffic. Connection with tandem 450 may be established via the PSTN (Public Switched Telephone Network), via a direct line, via a wireless connection or by another connection means including voice carrying data packets. Tandem 450 is coupled with a Public Safety Answering Point (PSAP, also sometimes referred to as a Public Safety Answering Position) 452. Connection may also be established between Central Office 412 and PSAP 452 directly without involving tandem 450. It is for this reason that tandem 450 is indicated in FIG. 4 using dotted line notation. PSAP 452 is the facility that fields inquiries and requests pertaining to emergency services, and either effects dispatching or cooperates with dispatchers for sending police, fire or emergency medical equipment and personnel to the scene of an emergency. Connection with PSAP 452 may be established via the PSTN, via a direct line or trunk, via a wireless connection or by another connection means including voice carrying data packets. PSAP 452 is able to access an ALI (Automatic Location Information) database 454 or other database that may be incorporated for use in the system to aid in call completion or data display. ALI database 454 is a specialized database correlating information particularly advantageous for E9-1-1 operations, including location information relating to phone numbers or how the telephone network should operate when servicing calls employing the present invention. ALI database 454 may be colocated with PSAP 452, but is commonly off-site with respect to PSAP 452 yet easily accessible by PSAP 452 manually or automatically. By consulting ALI database 454, personnel operating PSAP 452 or systems serving PSAP 452 can ascertain a location for the particular phone number from which an emergency call is originated.

This alternate system and method for providing location and call back information for special number calls from a PBX network 410 establishes a database that contains all phone numbers known by the PBX switch, whether the respective number is dialable or not. A dialable number, for purposes of this discussion, is a phone number that can be dialed by a party off-site from a PBX network for reaching a particular phone station in the PBX network. Such numbers are sometimes referred to as Direct Inward Dialable (DID) numbers. Dialable numbers, in this context, also include phone numbers that can be used by a party within a PBX network to dial directly to an outside party without involving a PBX switch serving the PBX network. For each phone number contained in the database full location information is recorded. The database is kept up to date either manually or using an automated system and is preferably maintained on site at PBX network 410. Alternatively, the database may be maintained at a location remote from PBX network 410. Preferably, the database is located in a location that is accessible by PSAP 452 and can be updated by PBX switch 416. In the embodiment of the system of the present invention illustrated in FIG. 4, a store 417 is maintained on premises at PBX network 410 and may be updated and otherwise maintained by PBX switch 416. Also provided in the embodiment of the system of the present invention illustrated in FIG. 4 is a communication path 419 coupling PBX switch 416 with ALI database 454. Communication path 419 permits PBX switch 416 to maintain the information relating to each phone number within PBX network 410 and its respective location on ALI database 454. Preferably, communication line 419 is a high speed data communication line. Alternate embodiments of the invention may provide a communication line coupling store 417 with ALI database 454 (as indicated at 415; FIG. 4), coupling store 417 with PSAP 452 (not shown in FIG. 4) or coupling store 417 with ALI database 454 and PSAP 452. Among the information stored in one or both of store 417 and ALI database 454 is a flag associated with each respective phone number known to PBX switch 416. When an E9-1-1 call is received on a trunk 414 (or other connection) from PBX switch 416, PBX switch 416 substantially simultaneously with connecting the E9-1-1 call communicates via communication line 419 to set the particular flag associated with the phone number that originated the E9-1-1 call from within PBX network 410.

Central Office 412 routes the E9-1-1 call to PSAP 452 (either via tandem 450 or via another routing). PSAP 452 recognizes the trunk number from which the E9-1-1 call is received. PSAP 452 knows by that trunk number that the E9-1-1 call has been received from PBX switch 416 and that further location information is available in a location database. That location database is preferably ALI 454. Alternatively the location database may be store 417 or another location so long as some means for accessing store 417 (or another location, if involved) is provided for PSAP 452. PSAP 452 accesses the location database to determine which flag has been set by PBX switch 416. Details for accessing store 417 are not shown in FIG. 4; communication line 419 may be employed in establishing the required access. Information regarding location of the particular phone number associated with the flag that has been set by PBX switch 416 is used by PSAP 452 in responding to the E9-1-1 call. At least one contact parameter such as a call back number for use by PSAP 452 is preferably included among the location information provided in the details associated with the particular flagged phone number. Contact parameters may also preferably include call routing information to allow the call to be delivered to the correct PSAP.

In summary, the second embodiment of the present invention provides for PBX switch 416 to maintain an up-to-date table of phone numbers and location/call back information in an information database accessible by PSAP 452. When an E9-1-1 call is placed, PBX switch 416 substantially simultaneously connects the call with Central Office 412 and communicates with the information database to effect an indication in the information database as to which phone number originated the E9-1-1 call. PSAP 452 is aware that for E9-1-1 calls received from PBX switch 416 there is further detailed location/call back information available if PSAP 452 queries an information database. In the preferred embodiment of the system, PBX 416 switch has direct communication with the information database, and the information database is preferably ALI database 454.

Figure 5:
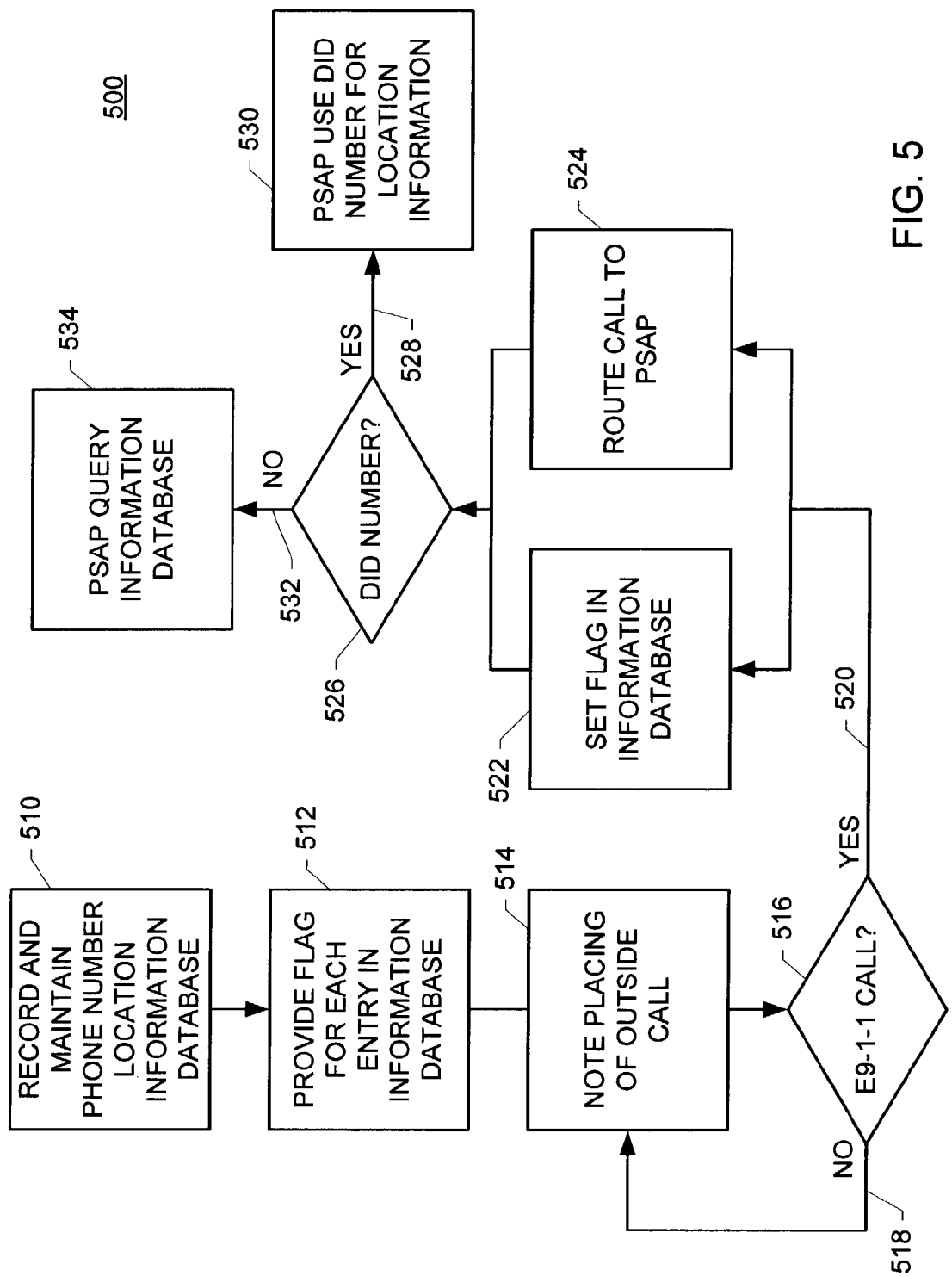
FIG. 5 is a flow diagram illustrating a second embodiment of the method of the present invention.

FIG. 5 is a flow diagram illustrating a second embodiment of the method of the present invention. In FIG. 5, a method 500 begins with creating an information database to record and maintain a list of every telephone number known to the PBX switch, as indicated by a block 510. A phone number is recorded in the information database regardless of whether the phone number is a Direct Inward Dialable (DID) number, a number otherwise recognizable by phone facilities external to the PBX network served by the PBX switch, an internal number to the PBX network or another type of number. For each telephone number there is an associated recorded set of location information. The location information preferably includes a call back number associated with the phone number that can be used by a caller external to the PBX network for reaching a call originator within the PBX network. The information database is maintained to keep it current as phone instruments may change access loci within the PBX network.

Method 500 continues by providing a flag for each phone number entry in the information database, as indicated by a block 512. Method 500 continues with the PBX switch noting the occurrence of placing an outgoing call from a station within the PBX network, as indicated by a block 514. Method 500 continues by posing a query, as indicated by a query block 516, whether the call placed is an E9-1-1 call (or other call to be subjected to this call treatment, such as another special number call). If the call is not an E9-1-1 call, method 500 proceeds according to "NO" response line 518 to return to block 514 and await placement of another outgoing call. If the call is an E9-1-1 call, method 500 proceeds according to "YES" response line 520. Method 500 continues by, in no particular order, routing the E9-1-1 call to the PSAP, as indicated by a block 524, and setting the flag in the information database that is associated with the phone number from which the E9-1-1 call originated, as indicated by a block 522. The setting of the flag according to block 522 identifies to any party who accesses the information database the particular phone number from which the E9-1-1 call originated and pertinent location information associated with that particular phone number.

Method 500 continues by posing a query whether the phone number from which the E9-1-1 call originated is a Direct Inward Dialing (DID) number, as indicated by a query block 526. A DID number allows a party outside the PBX network to directly access a party within the PBX network by dialing the DID number. If the phone number from which the E9-1-1 call originated is a DID number, method 500 proceeds according to "YES" response line 528 and method 500 provides that the PSAP use the DID number for location information and for call back to the E9-1-1 call originator, as indicated by a block 530. If the phone number from which the E9-1-1 call originated is not a DID number, method 500 proceeds according to "NO" response line 532 and method 500 provides that the PSAP queries the information database to ascertain location and call back information for dealing with the E9-1-1 call, as indicated by a block 534.

Thus, when an E9-1-1 call is placed from within the PBX network, the PBX switch substantially simultaneously routes the call to the PSAP and communicates with the information database to effect an indication in the information database as to which phone number originated the E9-1-1 call. The PSAP is aware that for E9-1-1 calls received from the PBX switch there is further detailed location/call back information available if the PSAP queries the information database. Preferably the PBX switch has direct communication with the information database, and the information database is preferably an ALI database. It is worthy to note that while the DID number may be used for call back, location information relating to DID numbers is also preferably recorded in the information database to aid emergency workers in precisely determining the locus within the PBX network from which the E9-1-1 call originated.

The call back information provided by the information database may be in the form of a pseudo-number, as discussed in connection with FIGS. 2 and 3. In situations involving such pseudo-numbers, method 500 may proceed from block 534 to include method steps substantially similar to method steps 322 through 344 (FIG. 3) to assign and employ a pseudo-number for effecting call back to an originating caller and return the pseudo-number to a pool of numbers for later use. Preferably, return of the pseudo-number to a pool for later use involves a lag timer, as described in connection with steps 340 through 344 (FIG. 3).

Figure 6:
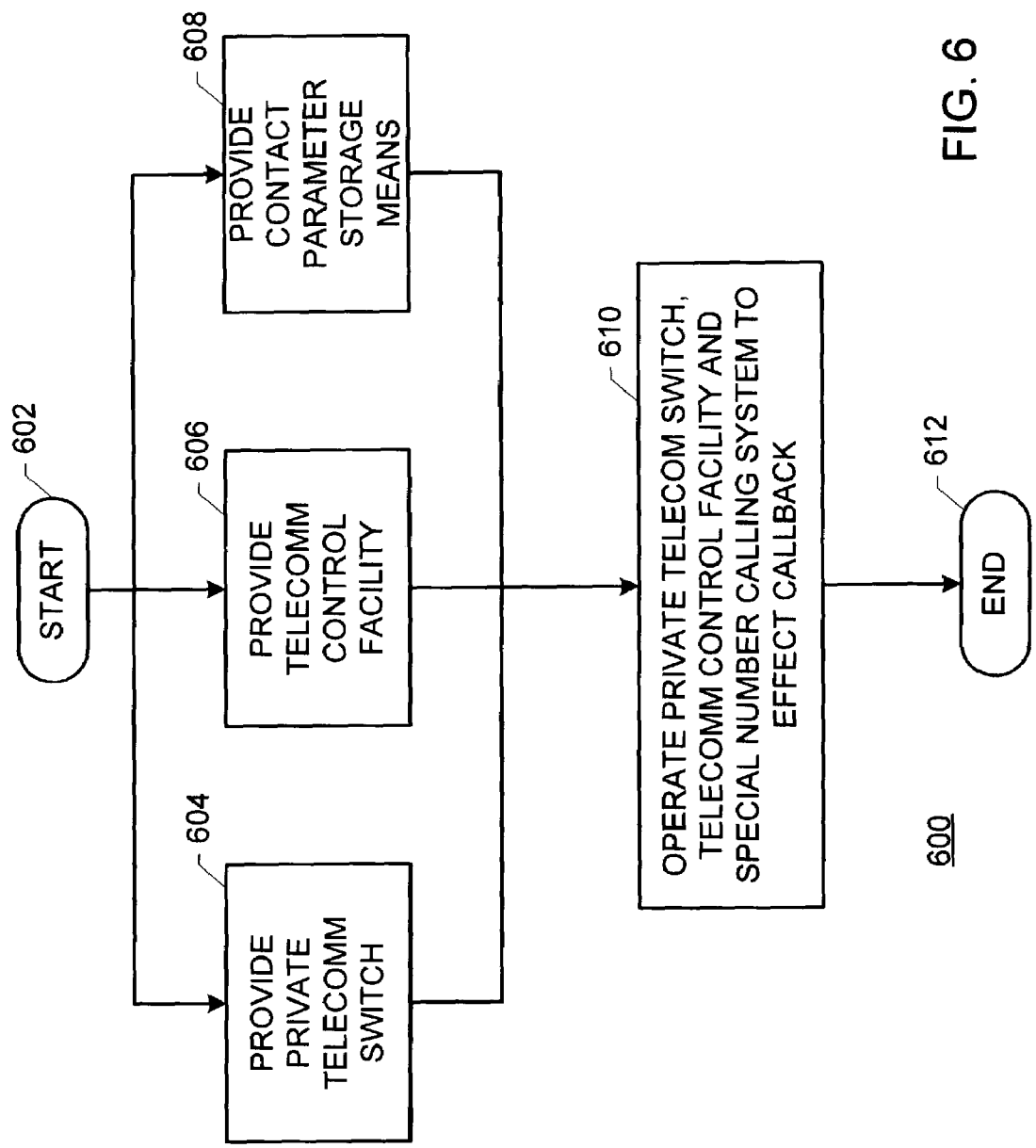
FIG. 6 is a flow diagram illustrating the preferred embodiment of the method of the present invention.

FIG. 6 is a flow diagram illustrating the preferred embodiment of the method of the present invention. In FIG. 6 a method 600 for handling special number calls placed from a phone instrument served by a privately served network; the phone instrument being coupled within the privately served network at a connection locus; begins at a START locus 602. Method 600 continues with the steps of (a) in no particular order: (1) providing a private telecommunication switch apparatus for controlling communications with the phone instrument from outside the privately served network during a call session, as indicated by a block 604; (2) providing a telecommunication control facility coupled with the private telecommunication switch apparatus and with a special number call system for effecting communications between the privately served network and the special number call system, as indicated by a block 606; and (3) providing a contact parameter storage means coupled with at least one of the private telecommunication switch apparatus and the special number call system for identifying at least one contact parameter relating to the connection locus at least during the call session, as indicated by a block 608; and (b) operating the private telecommunication switch apparatus, the telecommunication control facility and the special number call system to cooperate in using the contact parameter to effect call back from the special number call system to the phone instrument at least during the call session, as indicated by a block 610. Method 600 proceeds thereafter to an END locus 612.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention.

I claim:

1. A system for handling special number calls placed from a phone instrument served by a privately served network; said phone instrument being coupled within said privately served network at one of a plurality of connection loci; the system comprising:
   (a) a private telecommunication switch apparatus; said private telecommunication switch apparatus controlling communications with said phone instrument from outside said privately served network during a call session;
   (b) a telecommunication control facility coupled with said private telecommunication switch apparatus;
   (c) a special number call system for receiving special number calls; and
   (d) a contact parameter storage means for storing a plurality of contact parameters wherein at least one of said contact parameters is selected during said call session, wherein each of said plurality of contact parameters is related to at least one of said connection loci at least during said call session and wherein said selected contact parameter is associated with said phone instrument at least during said call session;
   wherein said private telecommunication switch apparatus is coupled between said privately served network and said special number call system for effecting communications between said privately served network and said special number call system;
   wherein said contact parameter storage means is separately coupled to said private telecommunication switch apparatus and to said special number call system for identifying at least one contact parameter relating to said one of said plurality of connection loci at least during said call session;
   wherein said private telecommunication switch apparatus, said telecommunication control facility and said special number call system cooperate in using said contact parameter to effect call back from said special number call system to said phone instrument at least during said call session; and
   wherein said special number call system obtains an identification of the one of the plurality of connection loci associated with said phone instrument by querying said contact parameter storage means during said call session.

2. A system for handling special number calls placed from a phone instrument served by a privately served network as recited in claim 1 wherein said contact parameter is a pseudo-number assigned to said phone instrument when said call session is initiated.

3. A system for handling special number calls placed from a phone instrument served by a privately sewed network as recited in claim 2 wherein said private telecommunication switch apparatus conveys said pseudo-number with other call information when effecting communications with said telecommunication control facility for said call session.

4. A system for handling special number calls placed from a phone instrument served by a privately served network as recited in claim 1 wherein said special number call system includes at least one call answering facility and wherein said at least one call answering facility is coupled with said contact parameter storage means.

5. A system for handling special number calls placed from a phone instrument served by a privately served network as recited in claim 1 wherein said contact parameter is a direct inward dialable number.

6. A system for handling special number calls placed from a phone instrument served by a privately served network as recited in claim 1 wherein at least one of:
   (a) said coupling between said contact parameter storage means and said private telecommunication switch apparatus and
   (b) said coupling between said contact parameter storage means and said special number call system
   is via a high speed data communication line.

7. A system for handling special number calls placed from a phone instrument served by a privately served network as recited in claim 3 wherein said special number call system is an emergency services call system.

8. A system for handling special number calls placed from a phone instrument served by a privately served network as recited in claim 6 wherein said special number call system is an emergency services call system.

9. A system for handling emergency service calls placed from a selected phone instrument of a plurality of phone instruments served by a private branch exchange network; said selected phone instrument being coupled with said private branch exchange network at one of a plurality of connection loci for a call session; the system comprising:

(a) a private telecommunication switch apparatus controlling communications with said selected phone instrument;
(b) a telecommunication control facility coupled with said private telecommunication switch apparatus;
(c) an emergency service call system for receiving emergency service calls;
(d) a contact parameter storage means for storing a plurality of contact parameters wherein at least one of said contact parameters is selected during said call session, wherein each of said plurality of contact parameters is related to at least one of said connection loci at least during said call session and wherein said selected contact parameter is associated with said phone instrument during said call session;
wherein said private telecommunication switch apparatus is coupled between said private branch exchange network and said emergency service call system for effecting communications between said private branch exchange network and said emergency service call system;
wherein said contact parameter storage means is coupled with said private telecommunication switch apparatus and is separately coupled to said emergency service call system for identifying at least one contact parameter relating to said one of said plurality of connection loci at least during said call session; and
wherein said private telecommunication switch apparatus, said telecommunication control facility and said emergency service call system cooperate in using said contact parameter to effect call back from said emergency service call system to said selected phone instrument at least during said call session; and
wherein said special number call system obtains an identification of the one of the plurality of connection loci associated with said phone instrument by querying said contact parameter storage means during said call session.

10. A system for handling emergency service calls placed from a selected phone instrument of a plurality of phone instruments served by a private branch exchange network as recited in claim 9 wherein said contact parameter is a pseudo-number assigned to said selected phone instrument when said call session is initiated.

11. A system for handling emergency service calls placed from a selected phone instrument of a plurality of phone instruments served by a private branch exchange network as recited in claim 10 wherein said private telecommunication switch apparatus conveys said pseudo-number when effecting communications with said telecommunication control facility for said call session.

12. A system for handling emergency service calls placed from a selected phone instrument of a plurality of phone instruments served by a private branch exchange network as recited in claim 9 wherein said emergency service call system includes at least one public safety answering point and wherein said at least one public safety answering point is coupled with said contact parameter storage means.

13. A system for handling emergency service calls placed from a selected phone instrument of a plurality of phone instruments served by a private branch exchange network as recited in claim 12 wherein said contact parameter is a direct inward dialable number associated with said connection locus.

14. A system for handling emergency service calls placed from a selected phone instrument of a plurality of phone instruments served by a private branch exchange network as recited in claim 13 wherein at least one of:
(a) said coupling between said contact parameter storage means and said private telecommunication switch apparatus and
(b) said coupling between said contact parameter storage means and said emergency service call system
is via a high speed data communication line.

15. A method for handling special number calls placed from a phone instrument served by a privately served network to a special number call system via a private telecommunication switch apparatus controlling communications with said phone instrument from outside said privately served network during a call session; said phone instrument being coupled within said privately served network at one of a plurality of connection loci; the method comprising the steps of:
(1) providing a contact parameter storage means coupled with said private telecommunication switch apparatus and separately coupled to said special number call system;
(2) storing in said contact parameter storage means a plurality of contact parameters each of which relates to at least one of said connection loci;
(3) selecting at least one of said contact parameters relating to said one of said connection loci;
(4) identifying said at least one of said contact parameters at least during said call session; and
(5) operating said private telecommunication switch apparatus and said special number call system to cooperate in using said at least one of said contact parameters to effect call back from said special number call system to said phone instrument at least during said call session by said special number call system querying said contact parameter storage means.

16. A method for handling special number calls placed from a phone instrument served by a privately served network as recited in claim 15 wherein said contact parameter is a pseudo-number assigned to said phone instrument when said call session is initiated.

17. A method for handling special number calls placed from a phone instrument served by a privately served network as recited in claim 16 wherein said private telecommunication switch apparatus conveys said pseudo-number when effecting communications with said special number call system for said call session.

18. A method for handling special number calls placed from a phone instrument served by a privately served network as recited in claim 15 wherein said special number call system includes at least one call answering facility and wherein said at least one call answering facility is coupled with said contact parameter storage means.

19. A method for handling special number calls placed from a phone instrument served by a privately served network as recited in claim 15 wherein said contact parameter is a direct inward dialable number associated with said one of said plurality of connection loci.

* * * * *